United States Patent
Mao et al.

(10) Patent No.: US 9,933,945 B1
(45) Date of Patent: Apr. 3, 2018

(54) EFFICIENTLY SHRINKING A DYNAMICALLY-SIZED VOLUME

(71) Applicant: EMC IP Holding Company LLC, Hopkinton, MA (US)

(72) Inventors: Qi Mao, Shanghai (CN); Jean-Pierre Bono, Westborough, MA (US); Ahsan Rashid, Edison, NJ (US); Xianlong Liu, Shanghai (CN); Chang Yong Yu, Shanghai (CN); Ruiling Dou, Shanghai (CN); Alexander Mathews, Morganville, NJ (US); Henry Fang, Beijing (CN); Gyanesh Kumar Choudhary, Edison, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/282,221

(22) Filed: Sep. 30, 2016

(51) Int. Cl.
  *G06F 3/06* (2006.01)
  *G06F 17/30* (2006.01)
(52) U.S. Cl.
  CPC ............ *G06F 3/0608* (2013.01); *G06F 3/067* (2013.01); *G06F 3/0644* (2013.01); *G06F 3/0647* (2013.01); *G06F 3/0683* (2013.01); *G06F 17/30138* (2013.01)
(58) Field of Classification Search
  CPC .... G06F 3/0608; G06F 3/0644; G06F 3/0647; G06F 3/067; G06F 3/0683; G06F 17/30138
  USPC ................. 711/165, 154, 156, 170
  See application file for complete search history.

(56) References Cited

U.S. PATENT DOCUMENTS

| 5,675,769 | A | 10/1997 | Ruff et al. |
| 5,737,549 | A * | 4/1998 | Hersch ................ G06F 11/1076 345/505 |
| 6,330,653 | B1 | 12/2001 | Murray et al. |
| 6,453,383 | B1 * | 9/2002 | Stoddard ............... G06F 3/0607 707/999.202 |
| 6,487,563 | B1 | 11/2002 | Houldsworth |
| RE38,410 | E * | 1/2004 | Hersch .............. G06F 17/30067 345/505 |
| 7,296,043 | B2 | 11/2007 | Bailey |
| 7,409,523 | B2 * | 8/2008 | Pudipeddi ............. G06F 3/0607 711/153 |
| 7,631,155 | B1 * | 12/2009 | Bono .................... G06F 3/0608 707/999.202 |
| 7,739,312 | B2 * | 6/2010 | Gordon ................. G06F 3/0608 707/802 |
| 7,827,201 | B1 * | 11/2010 | Gordon ............. G06F 17/30607 707/792 |
| 8,140,814 | B2 | 3/2012 | Agombar et al. |
| 8,171,201 | B1 * | 5/2012 | Edwards, Sr. ...... G06F 9/45558 711/112 |

(Continued)

OTHER PUBLICATIONS

Jean-Pierre Bono, et al.; "Proactive Scavenging of File System Snaps," U.S. Appl. No. 14/319,660, filed Jun. 30, 2014.

*Primary Examiner* — Stephen Elmore
(74) *Attorney, Agent, or Firm* — BainwoodHuang

(57) ABSTRACT

Techniques for shrinking a filesystem backed by a volume identify slices in the volume to be evacuated in order to reach a target size, identify a target endpoint in the volume, and evacuate identified slices to available locations prior to the target endpoint. The same data is typically not moved from slice to slice multiple times.

20 Claims, 5 Drawing Sheets

(56) References Cited

U.S. PATENT DOCUMENTS

| | | | |
|---|---|---|---|
| 8,204,871 B1 * | 6/2012 | Pawar | G06F 17/30132 |
| | | | 707/639 |
| 8,332,571 B1 * | 12/2012 | Edwards, Sr. | G06F 9/45558 |
| | | | 711/112 |
| 8,370,401 B2 * | 2/2013 | Gordon | G06F 17/30607 |
| | | | 707/808 |
| 8,392,458 B2 * | 3/2013 | Fukatani | G06F 3/0608 |
| | | | 707/791 |
| 8,600,949 B2 * | 12/2013 | Periyagaram | G06F 3/0608 |
| | | | 707/664 |
| 8,793,290 B1 | 7/2014 | Pruthi et al. | |
| 9,043,287 B2 * | 5/2015 | Periyagaram | G06F 3/0608 |
| | | | 707/672 |
| 9,430,492 B1 | 8/2016 | Bono et al. | |
| 2002/0091903 A1 | 7/2002 | Mizuno | |
| 2004/0254907 A1 | 12/2004 | Crow et al. | |
| 2005/0055492 A1 | 3/2005 | Muthulingam et al. | |
| 2006/0101204 A1 | 5/2006 | Bao | |
| 2007/0143563 A1 | 6/2007 | Pudipeddi et al. | |
| 2007/0266037 A1 | 11/2007 | Terry et al. | |
| 2007/0288531 A1 * | 12/2007 | Motta | G06F 17/30076 |
| 2010/0082715 A1 | 4/2010 | Dohm et al. | |
| 2012/0151245 A1 | 6/2012 | Chang et al. | |
| 2012/0239896 A1 | 9/2012 | Sobel | |
| 2013/0110790 A1 | 5/2013 | Matsumoto et al. | |
| 2013/0111103 A1 | 5/2013 | Dodson et al. | |

* cited by examiner

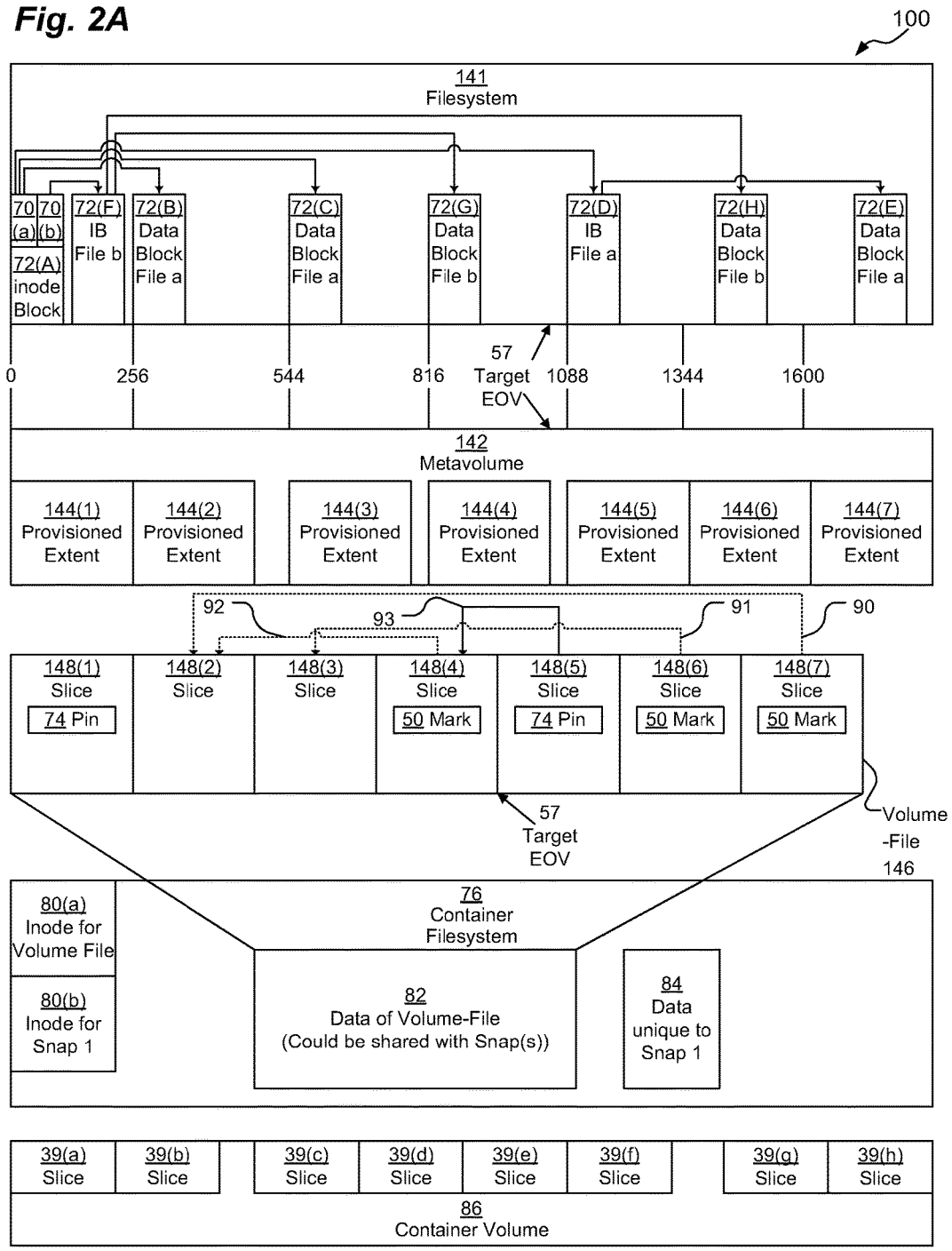

EFFICIENTLY SHRINKING A DYNAMICALLY-SIZED VOLUME

BACKGROUND

Data storage systems are arrangements of hardware and software that include storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, deleted, and so forth. Software running on the storage processors manages incoming storage requests and performs various data processing tasks to organize and secure the data elements stored on the non-volatile storage devices.

Filesystems are generally built upon volumes. In some data storage systems, slices of data storage may be provisioned to a volume that supports a filesystem on an as-needed basis. As is known, "slices" are uniformly-sized storage extents, which may be 256 megabytes (MB) or 1 gigabyte (GB), for example. When a filesystem requires additional storage space to accommodate incoming writes, a data storage system may provide the additional space by provisioning another slice to the volume that backs the filesystem.

SUMMARY

It sometimes happens that, after space is provisioned to a volume that supports a filesystem, contents may be deleted, reducing the actual space used by the filesystem. This may result in more storage being provisioned to the underlying volume than is necessary. Thus, it may be desirable to initiate a shrink operation to reduce the size of the volume. One approach attempts to clear one slice allocated to the volume by moving all blocks of data from that slice to other slices that have unused space. In this approach, once a slice has been cleared, another slice may be cleared in a similar fashion.

Unfortunately, after contents are moved from a first slice to a second slice, that second slice itself may be targeted for clearing, such that the contents of the first slice are moved twice. This can occur repeatedly, hindering the efficiency of the shrink operations by requiring the same data to be moved multiple times. Thus, it would be desirable to implement a shrink operation that proceeds more efficiently.

In contrast with the prior approach, which may suffer from inefficiencies, an improved technique for shrinking a filesystem backed by a volume identifies slices in the volume to be evacuated in order to reach a target size, identifies a target endpoint in the volume, and evacuates identified slices to available locations prior to the target endpoint. Advantageously, the need to move the same data multiple times is reduced or eliminated.

One embodiment is directed to a method, performed by a data storage system, of shrinking a dynamically-sized volume that supports a host-accessible filesystem. The volume is composed of a plurality of uniform-length extents of storage that are contiguously arranged within an address space of the volume. The volume has a length equal to a sum of lengths of the extents. The method includes, in response to a request to shrink the host-accessible filesystem to a target size, identifying a target endpoint of the volume, the target endpoint provided at an address in the address space of the volume that aligns with a boundary between two extents. A set of the extents are then identified for evacuation. The set of extents consist of a number of extents that equals a number of extents disposed at addresses in the address space that exceed the address of the target endpoint. For each of the set of extents, the method further includes copying contents of allocated blocks within that extent to available space on one or more extents not identified for evacuation and located at addresses less than the address of the target endpoint. After copying the contents of allocated blocks from the identified extents, the method still further includes truncating the volume by releasing from the volume the extents disposed at addresses in the address space that exceed the address of the target endpoint.

Other embodiments are directed to corresponding apparatuses, computer program products, and systems for performing similar methods.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views. In the accompanying drawings.

FIG. 2A is a block diagram depicting an example I/O stack for use in conjunction with various embodiments prior to and while performing an example method according to various embodiments.

DETAILED DESCRIPTION

Embodiments of the invention will now be described. It is understood that such embodiments are provided by way of example to illustrate various features and principles of the invention, and that the invention hereof is broader than the specific example embodiments disclosed.

An improved technique for shrinking a filesystem backed by a volume identifies slices in the volume to be evacuated in order to reach a target size, identifies a target endpoint in the volume, and evacuates identified slices to available locations prior to the target endpoint. Advantageously, the need to move the same data multiple times is reduced or eliminated.

Figure 1:
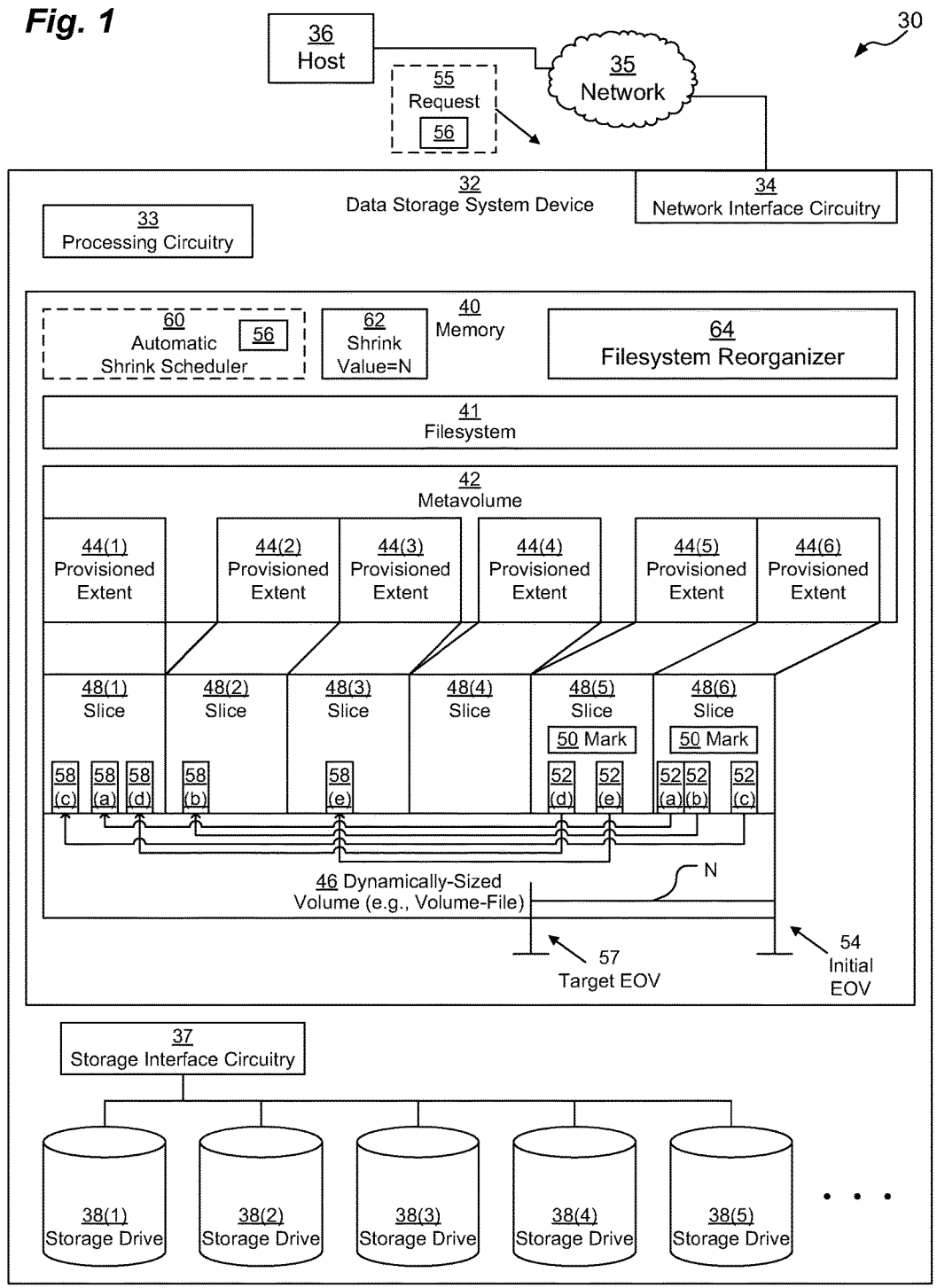
FIG. 1 is a block diagram depicting a logical view of an example system according to various embodiments.

FIG. 1 shows an example environment 30 in which embodiments of the improved techniques hereof can be practiced. Here, one or more host computing devices ("hosts") 36 access a data storage system device 32 over a network 35. The data storage system 32 includes processing circuitry 33, network interface circuitry 34, storage interface circuitry 37, a set of storage drives 38 (depicted as storage drives 38(1), 38(2), 38(3), 38(4), 38(5), . . . ), and memory 40.

In an example, the storage drives 38 may be arranged into one or more RAID groups where each RAID group is composed of multiple storage drives 38. The storage drives 38 may include magnetic disk drives, electronic flash drives, optical drives, and/or other types of persistent storage. As depicted, storage drives 38(1), 38(2), 38(3), 38(4), and 38(5) make up a RAID group.

The network 35 may be any type of network or combination of networks, such as a storage area network (SAN), a local area network (LAN), a wide area network (WAN), the Internet, and/or some other type of network or combination of networks, for example. The hosts 36 may connect to the data storage system 32 using various technologies, such as Fibre Channel, iSCSI, NFS, SMB 3.0, and CIFS, for example. Any number of hosts 36 may be provided, using any of the above protocols, some subset thereof, or other protocols besides those shown. As is known, Fibre Channel and iSCSI are block-based protocols, whereas NFS, SMB 3.0, and CIFS are file-based protocols. In an example, the data storage system 32 is configured to receive I/O requests according to both block-based and file-based protocols and to respond to such I/O requests by reading or writing to the storage drives 38.

Network interface circuitry 34 is configured to connect to network 35. Network interface circuitry 34 may be, for example, a SCSI target adapter or network interface adapters for converting electronic and/or optical signals received over the network 35 to electronic form for use by processing circuitry 33. The processing circuitry 33 includes one or more processing chips and/or assemblies. In a particular example, the processing circuitry 33 may include numerous multi-core CPUs. The storage interface circuitry 37 may include, for example, SCSI adapters and other disk interface adapters for communicating between the storage drives 38 and the processing circuitry 33 or memory 40.

The data storage system 32 may include multiple storage processors (not depicted). Each storage processor may include its own instance of the processing circuitry 33, network interface circuitry 34, storage interface circuitry 37, and memory 40. Multiple storage processors may be provided as circuit board assemblies, or "blades," which plug into a chassis, which encloses and cools the storage processors. The chassis has a backplane for interconnecting the storage processors, and additional connections may be made among storage processors using cables. It is understood, however, that no particular hardware configuration is required, as any number of storage processors, including a single storage processor, may be provided and the storage processor can be any type of computing device capable of processing host I/Os.

The memory 40 may include both volatile memory (e.g., random access memory, RAM), and non-volatile memory, such as one or more read-only memories (ROMs), disk drives, solid-state drives, and the like. At a minimum, memory 40 includes system memory, typically RAM. The processing circuitry 33 and the memory 40 together form control circuitry, which is constructed and arranged to carry out various methods and functions as described herein, e.g., alone or in coordination with similar control circuitry on another data storage system. Also, the memory 40 includes a variety of software constructs realized in the form of executable instructions. When the executable instructions are run by the processing circuitry 33, the processing circuitry 33 is caused to carry out the operations of the software constructs. Although certain software constructs are specifically shown and described, it is understood that the memory 40 typically includes many other software constructs, which are not shown, such as an operating system, various applications, processes, and daemons. Applications configured to run on processing circuitry 33 when stored in non-transitory form, either in the volatile portion or the non-volatile portion of memory 40 or both, form a computer program product. The processing circuitry 33 running one or more of these applications thus forms a specialized circuit constructed and arranged to carry out the various processes described herein.

As shown in FIG. 1, the memory 40 includes a sparse metavolume 42 that supports a filesystem 41. The metavolume 42 has a sparse address space into which one or more extents 44 (depicted as provisioned extents 44(1), 44(2), 44(3), 44(4), 44(5), 44(6)) have been provisioned. Because the metavolume 42 is sparse, there are typically locations in the address space of the metavolume 42 to which no extents 44 have been provisioned.

Each provisioned extent 44 is provisioned from a dynamically-sized volume 46. Extents within the dynamically-sized volume 46 (or, simply, the "volume") are identified as slices 48, i.e., 48(1) through 48(6), as depicted. One should appreciate that extents 44 correspond to the same storage as respective slices 48. The volume 46 also has an address space, in which slices 48 are arranged contiguously. Whereas the metavolume 42 is typically sparse, the volume 46 typically is not sparse. Thus, the address space of the metavolume 42 is typically much larger than the address space of the volume 46. Also, one may regard the volume 46 as providing a pool of slices 48. Although all slices 48 in the volume 46 are seen to be provisioned, volume 46 may include additional slices 48 that are not provisioned, but which may be available to be provisioned, for example, if the filesystem 41 were to grow.

In an example, volume 46 is provided in the form of a volume-file. In an example, the volume-file is a file disposed within an internal, container filesystem of the data storage system 32. For example, the volume-file has a logical address space, which the data storage system 32 renders as the above-described address space of the volume 46. The container file system may have a construction that is similar to that of the filesystem 41, i.e., it may rest on its own sparse metavolume, which may be composed of its own slices drawn from a storage pool built upon one or more RAID groups.

The volume 46 is seen to have a last slice 44(6), the end of which provides an initial endpoint, or end-of-volume (EOV) 54. However, if the volume 42 does not actually use all the space provided by the slices 48, it may be possible to shrink the volume 46 by moving contents found in some slices 48 to other slices 48. For example, it may be possible to rearrange contents such that all contents that support file system 41 fit into N fewer slices (N=2 in the example shown). Thus, a target EOV 57 may be provided that is N slices 48 in from the end of the volume 46. In an example, filesystem reorganizer 64 marks N slices 48 with a mark element 50 as subject to evacuation and subsequent freeing. In one embodiment, as depicted in FIG. 1, all slices 48 to the "right" of the target EOV 57 (i.e., having addresses in the volume 46 greater than that of the target EOV 57) are marked.

As depicted, allocated blocks 52 are evacuated from the N slices 48(5), 48(6) having marks 50. Filesystem reorganizer 64 moves the contents of each such block 52 to a new location on an unmarked slice 48 to the "left" of the target EOV 57 (i.e., having addresses in the volume 46 less than that of the target EOV 57). When moving contents of allocated blocks 52 in marked slices, the relative order of contents in the blocks 52 is not necessarily preserved; rather, as allocated blocks are moved, metadata in the filesystem 51 (e.g., block pointers) are updated to reflect new locations of contents. For example, the filesystem 51 also has an address space, which corresponds one-to-one with the address space of the sparse metavolume 52. As the filesystem reorganizer 64 moves contents from one slice to another, those contents are placed at new addresses in the sparse metavolume 42 and thus in the filesystem 41. Block pointers in the filesystem 41 are adjusted to point to the new addresses.

In the example shown, the contents of block 52(a) are relocated from marked slice 48(6) to block 58(a) on slice 48(1), the contents of block 52(b) are relocated from marked slice 48(6) to block 58(b) on slice 48(2), the contents of block 52(c) are relocated from marked slice 48(6) to block 58(c) on slice 48(1), the contents of block 52(d) are relocated from marked slice 48(5) to block 58(d) on slice 48(1), and the contents of block 52(e) are relocated from marked slice 48(5) to block 58(e) on slice 48(3). Block pointers in filesystem 51 are updated accordingly.

As further shown in FIG. 1, memory 40 also stores a shrink value 62 (e.g., set to N), and, in some embodiments, automatic shrink scheduler 60 (which may also be referred to as a utilization determination module). In some embodiments, data storage system 32 receives a shrink request 55 from a host 36 directing the filesystem reorganizer 64 to perform a shrink operation. The shrink request 55 includes a target size indicator 56. In other embodiments, automatic shrink scheduler 60 runs as a background process, periodically evaluating how many blocks of the provisioned extents 44 are currently in-use (e.g., allocated by filesystem 41) and comparing that number to the combined size of the slices 48 in volume 46. When the difference exceeds a threshold value (e.g., a threshold difference equal to the size of multiple slices 48), automatic shrink scheduler 60 may generate target size indicator 56 and initiate operation of filesystem reorganizer 64.

In an example, target size indicator 56 indicates a target size of the volume 42. The target size may be expressed, for example, as a number of slices 48, as a number of blocks, or in any other suitable manner. Also, the target size may be expressed as an absolute size, as a difference from a current size, or in any other suitable manner. Based on the target size, the filesystem reorganizer 64 may identify the target EOV 57. For example, the filesystem reorganizer 64 places the target EOV 57 at a slice boundary relative to volume 46 at which a sum of storage of all extents to the left of the target EOV 57 (having lesser addresses) equals or minimally exceeds the target size.

In some examples, slices marked for evacuation may include one or more slices located to the left of the target EOV 57 (i.e., at lower addresses). For example, contents of some slices may be required to remain together and/or in order, such that the above-described per-block relocation would be unsatisfactory, as it has a tendency to scatter relocated contents. These extents may be referred to herein as "pinned" slices. To deal with the requirements of pinned slices, the filesystem reorganizer 64 marks slices 48 to the left of the target EOV 57 for evacuation. The intention here is not to remove the marked slices that are to the left of the target EOV, but rather to create free space for receiving the entire contents of pinned slices to the right, such that the pinned slices to the right can then be removed. For example, a slice to the left of the target EOV 57 is marked and evacuated, and the contents of a pinned slice to the right of the target EOV are moved, block-for-block and in their original order, into the space made available in the evacuated slice. Mapping within the data storage system 32 is adjusted such that the layout of the sparse metavolume 42 remains unchanged, i.e., the pinned slice continues to be found at the same location as before in the sparse metavolume 42, even though its underlying position in the volume 46 has changed.

Even when accounting for pinned slices, the number (N) of slices to be removed from the volume 46 is typically the same as the number of slices to the right of the target EOV 57. For example, if there are N slices to the right of the target EOV 57 of which M slices are pinned, N-M slices to the right and M slices to the left would be evacuated (a total of N). Once per-block relocation of the N slices and bulk movement of the M pinned slices from right to left is performed, all N slices to the right of the target EOV 57 may be removed, i.e., truncated from the volume 46 such that the volume 46 becomes smaller by N slices 48.

FIG. 2A shows an example I/O stack arrangement 100 of a filesystem 141 on an example sparse metavolume 142 backed by an example dynamically-sized volume. In this example, the dynamically-sized volume (analogous to volume 46 of FIG. 1) is realized as a volume-file 146, which is a file residing in a container filesystem 76. The container file system 76 is itself built upon a container volume 86 composed of slices 39 (i.e., 39(a) through 39(h)). The arrangement of the container file system 76 is thus analogous to that of the host-accessible file system 41 of FIG. 1. It should be understood that slices 39 of the container volume 86 are different from slices 48 of the volume file. Slices 39 are typically apportioned from RAID groups of the storage drives 38. Although a slice 39 is typically the same size as a slice 48, this need not be the case. In addition, slices 48 do not necessarily map one-to-one to slices 39.

Host-accessible filesystem 141, as depicted, includes two inodes 70(a), 70(b) within an inode block 72(A) as is well-known in the art. It should be understood that a typical filesystem 141 actually includes many inodes 70 and inode blocks 72(A). Each inode 70 is provided for a respective file in file system 141. Thus, as depicted, inode 70(a) corresponds to file a, and inode 70(b) corresponds to file b. Each inode 70 points to various blocks 72 of the filesystem, some of which are data blocks, and some of which are indirect blocks that themselves point to data blocks or other indirect blocks as is well-known in the art.

Host-accessible filesystem 141 may be any kind of filesystem as is known in the art, such as, for example, the Unix Filesystem; UFS 64, as available from Dell/EMC Corporation of Hopkinton, Mass.; another POSIX-compatible filesystem; NTFS defined by Microsoft Corp. of Seattle, Wash.; FAT 32; or any other filesystem.

As depicted, filesystem 141 has an address space ranging from 0 bytes to 1,856 MB (actually 1856 MB minus 1 byte). As depicted, inode block 72(A) is located at address zero of the filesystem 141, which is backed by provisioned extent 144(1) of the underlying volume 142.

Inode 70(a) points to data blocks of file a 72(B) at address 256 MB (backed by provisioned extent 144(2)), and 72(C) at address 544 MB (backed by provisioned extent 144(3)). Inode 70(a) also points to indirect block 72(D) of file a at address 1088 MB (backed by provisioned extent 144(5)), which, in turn points to data block 72(E) of file a at an unspecified address in the range of 1600 to 1856 MB backed by provisioned extent 144(7). It should be understood that although inode 70(a) only points to two direct blocks 72(B), 72(C), this is by way of simplicity of illustration only; typically an inode 70 that points to an indirect block will also point to more than two blocks 72 directly (e.g., 12 direct block pointers as well as three indirect block pointers).

Inode 70(b) points to indirect block 72(F) of file b at an unspecified address less than 256 MB backed by provisioned extent 144(1). It should be understood that although inode

70(*b*) does not point to any direct blocks, this is only for simplicity of illustration, as explained above. As depicted, indirect block 72(F) points to direct block 72(G) of file b at address 816 MB (backed by provisioned extent 144(4)) as well as at block 72(H) of file b at an unspecified address in the range of 1344 to 1600 MB backed by provisioned extent 144(6).

As depicted in FIG. 2A, there is an unprovisioned hole of size 32 MB starting at address 512 MB (between provisioned extents 144(2) and 144(3)). There are also unprovisioned holes of size 16 MB starting at address 800 MB (between provisioned extents 144(3) and 144(4)) and starting at address 1072 MB (between provisioned extents 144(4) and 144(5)).

Volume file 146 is composed of seven contiguous slices 148 (depicted as slices 148(1), 148(2), 148(3), 148(4), 148(5), 148(6), 148(7)). Slice 148(1) backs provisioned extent 144(1), slice 148(2) backs provisioned extent 144(2), slice 148(3) backs provisioned extent 144(3), slice 148(4) backs provisioned extent 144(4), slice 148(5) backs provisioned extent 144(5), slice 148(6) backs provisioned extent 144(6), and slice 148(7) backs provisioned extent 144(7).

Volume-file 146 is located in container filesystem 76, defined by inode 80(*a*). As depicted, the data of volume-file 146 is stored within data blocks in region 82. There may also be additional inodes 80 in filesystem 76 that define snapshots of the primary volume 146 at previous points in time. For example, inode 80(*b*) defines snap 1, pointing to data blocks within regions 82 and 84 (some blocks in region 82 may be shared).

Container filesystem 76 may also be any kind of filesystem as is known in the art, such as, for example, the Unix Filesystem; UFS 64; another POSIX-compatible filesystem; NTFS; FAT 32; or any other filesystem.

Container filesystem 76 itself rests on container volume 86, which is a volume having a sparse address space provisioned with storage slices 39 provided by the storage drives 38. As depicted, container volume is provisioned with eight storage slices 39(*a*)-39(*h*), each 256 MB in size. There are also unprovisioned areas located between storage slices 39(*b*) and 39(*c*) and between storage slices 39(*f*) and 39(*g*) on container volume 86. As depicted, the target EOV 57 is at the end of slice 148(4) within volume-file 146.

In an example, the first slice 148(1) is pinned. In addition, certain slices 148 that contain metadata of the filesystem 141 are pinned. There may also be other reasons to pin slices (e.g., sets of slices 148 may be grouped together, and a first slice 148 of each group may be required to be pinned, depending on the embodiment) which go beyond the scope of this document. As depicted in FIG. 2A, slices 148(1) and 148(5) are pinned.

As depicted in FIG. 2A, the target EOV 57 is at the end of slice 148(4), meaning that the shrink value 62 (N) is equal to three. Thus, three slices 148 are marked for evacuation. However, pinned slices 148 cannot be marked because evacuation would destroy the block ordering within a slice. Since one of the slices 148(5) to the right of the target EOV 57 is pinned as depicted in FIG. 2A, a slice 148(4) to the left of the target EOV 57 is also marked. Every slice 148 to the right of the target EOV 57 is either marked or pinned. However, any slices 148 to the left of the target EOV 57 may be selected to be marked as long as they are not pinned. The reason slices 148 to the left of the target EOV 57 are marked is to provide empty slices 148 into which the pinned slices to the right of the target EOV 57 may be moved.

In example operation, contents of blocks within marked slices of the volume-file 146 are copied to empty space within unmarked and unpinned slices to the left of the target EOV 57 (referred to as slice evacuation). All pinned slices to the right of the target EOV 57 are relocated to empty slices to the left of the target EOV 57 while preserving the order of blocks within each pinned slice. Thus, for example, initially, marked slice 148(7) is evacuated (step 90). Since marked slice 148(7) only contains a single block, block 72(E), that block 72(E) is copied to the left of the target EOV 57, e.g., to slice 148(2). Then, marked slice 148(6) is evacuated (step 91). Since marked slice 148(7) only contains a single block, block 72(H), that block 72(H) is copied to the left of the target EOV 57, e.g., to slice 148(3). Filesystem Reorganizer 64 may then attempt to relocate pinned slice 148(5), but since there are no empty slices to the left of the target EOV 57, it first evacuates slice 148(4) (step 92). Since marked slice 148(4) only contains a single block, block 72(G), that block 72(G) is copied to the left of the target EOV 57, e.g., to slice 148(2). The, pinned slice 148(5) may be relocated to slice 148(4), which is now empty (step 93). At some point after evacuating or relocating each slice 148 located to the right of the target EOV 57, Filesystem Reorganizer 64 also frees that slice from the volume-file 146.

Figure 2B:
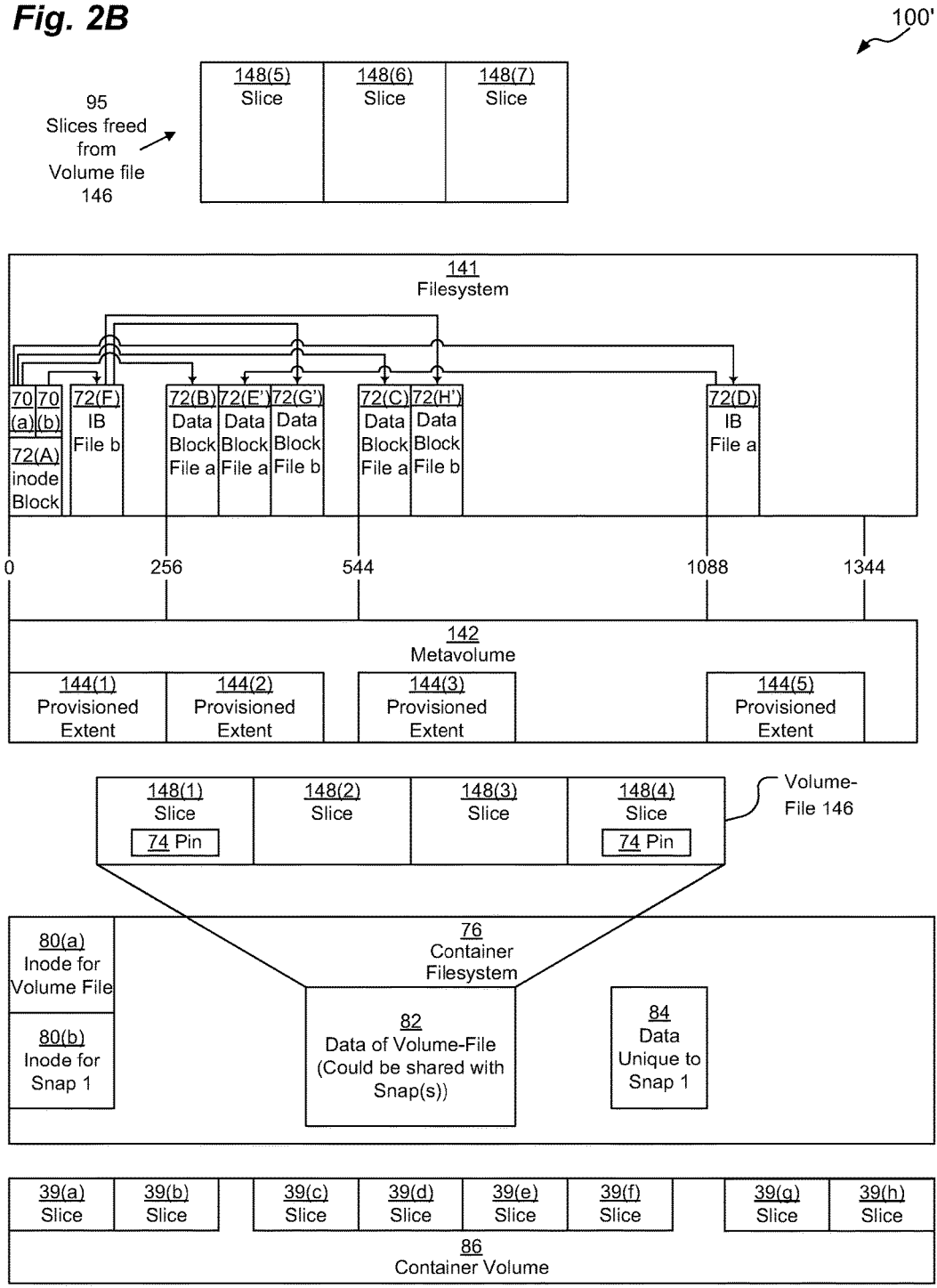
FIG. 2B is a block diagram depicting an example I/O stack for use in conjunction with various embodiments after performing an example method according to various embodiments.

FIG. 2B depicts an example I/O stack arrangement 100' of the storage stack from FIG. 2A subsequent to the shrink occurring according to various embodiments.

After evacuation of slice 148(7) in step 90, the contents of block 72(E) on slice 148(7) have now been moved to block 72(E') on slice 148(2). The filesystem address of the block has also changed to now be between 256 MB and 512 MB. Thus, the pointer in indirect block 72(D) has been updated accordingly.

After evacuation of slice 148(6) in step 91, the contents of block 72(H) on slice 148(6) have now been moved to block 72(H') on slice 148(3). The filesystem address of the block has also changed to now be between 544 MB and 800 MB. Thus, the pointer in indirect block 72(F) has been updated accordingly.

After evacuation of slice 148(4) in step 92, the contents of block 72(G) on slice 148(4) have now been moved to block 72(G') on slice 148(2). The filesystem address of the block has also changed from address 816 MB to now be between 256 MB and 512 MB. Thus, the pointer in indirect block 72(F) has been updated accordingly.

It should be noted that the relative locations of blocks 72(E), 72(H), and 72(G) within their respective slices 148(7), 148(6), 148(4) are not related to the relative locations of blocks 72(E'), 72(H'), and 72(G') within their respective slices 148(2), 148(3), 148(2).

After relocation of slice 148(5) to slice 148(4) in step 93, all contents of slice 148(5) have been copied, in order, to the same relative locations within slice 148(4). Thus, indirect block 72(D) has been copied from the beginning of slice 148(5) to the beginning of slice 148(4). However, slice 148(4) has now become mapped to provisioned extent 144(5) instead of the previous provisioned extent 144(4). Thus, the filesystem address of indirect block 72(D) remains at 1088 MB, and the inode 70(*a*) need not be updated in response to this slice relocation.

It should be noted that although, as depicted, the inodes 70 are not updated in response to any block evacuation, that is only because the blocks 72 that were evacuated in the example of FIGS. 2A and 2B were pointed to by indirect blocks 72(D), 72(F). However, if a block 72 pointed to directly by an inode 70 were within a marked slice 148, then upon evacuation of that slice 148, the block would move, and the respective pointer within the inode 70 would be updated accordingly.

The slices 148(5), 148(6), 148(7) which have been freed from the volume-file 146 now become freed slices 95. Eventually, the freeing of slices 148 may create free space in the container filesystem 76, which might itself become eligible for storage reclamation, e.g., in a similar manner as that described above for the file system 141. For example, slices 39 may be evacuated, their contents may be moved, and slices 39 may be reclaimed, e.g., sent back to an underlying pool for use elsewhere.

Figure 3A:
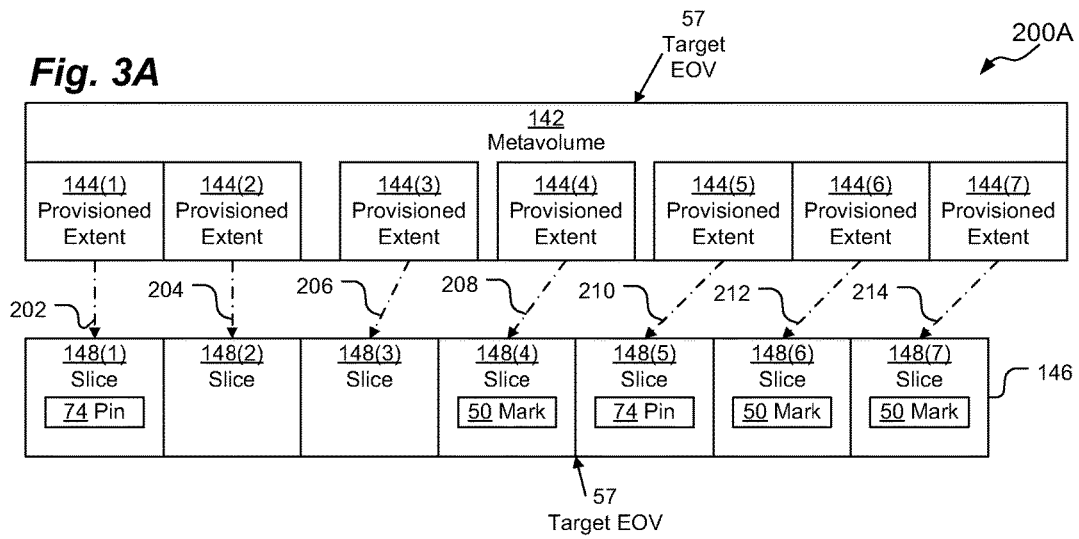
FIGS. 3A-3C are block diagrams depicting example mappings between a volume layer and a volume file layer of an example data storage system in various stages of an example shrink operation according to various embodiments.

FIG. 3A depicts a set 200A of mapping relationships 202, 204, 206, 208, 210, 212, 214 between the provisioned extents 144 and the slices 148 of FIG. 2A. Thus, as depicted, mapping relationship 202 indicates that slice 148(1) maps to the addresses in the range of provisioned extent 144(1); mapping relationship 204 indicates that slice 148(2) maps to the addresses in the range of provisioned extent 144(2); mapping relationship 206 indicates that slice 148(3) maps to the addresses in the range of provisioned extent 144(3); mapping relationship 208 indicates that slice 148(4) maps to the addresses in the range of provisioned extent 144(4); mapping relationship 210 indicates that slice 148(5) maps to the addresses in the range of provisioned extent 144(5); mapping relationship 212 indicates that slice 148(6) maps to the addresses in the range of provisioned extent 144(6); and mapping relationship 214 indicates that slice 148(7) maps to the addresses in the range of provisioned extent 144(7).

Figure 3B:
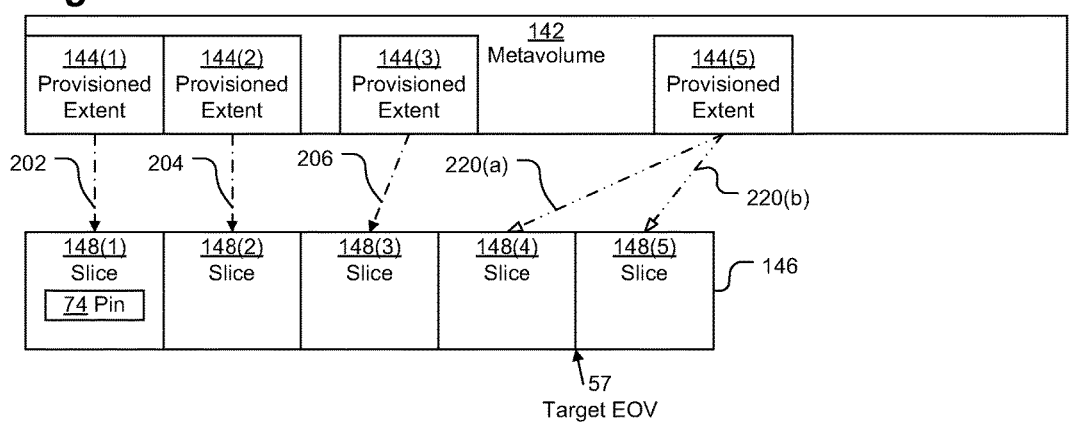

FIG. 3B depicts an example set 200B of mapping and mirroring relationships 202, 204, 206, 220(a), 220(b) between the provisioned extents 144 and the slices 148 of FIG. 2B during performance of step 93. FIG. 3B is depicted in an example embodiment in which all marked slices 148 are freed prior to performing the relocation of pinned slice 148(5). Mapping relationships 202, 204, and 206 remain in place as before.

In the embodiment of FIG. 3B, filesystem reorganizer 64 sets up mirroring relationships 220(a), 220(b) for provisioned extent 144(5). Thus, provisioned extent 144(5) is now mirrored on both slice 148(4) and slice 148(5). Thus, any write requests (or deletes, etc.) which are directed to filesystem addresses within provisioned extent 144(5) are now written to the corresponding locations on both slice 148(4) and slice 148(5). While these mapping relationships 220(a), 220(b) are ongoing, blocks are copied directly from slice 148(5) to slice 148(4) to corresponding addresses within those slices 148(4), 148(5).

Figure 3C:
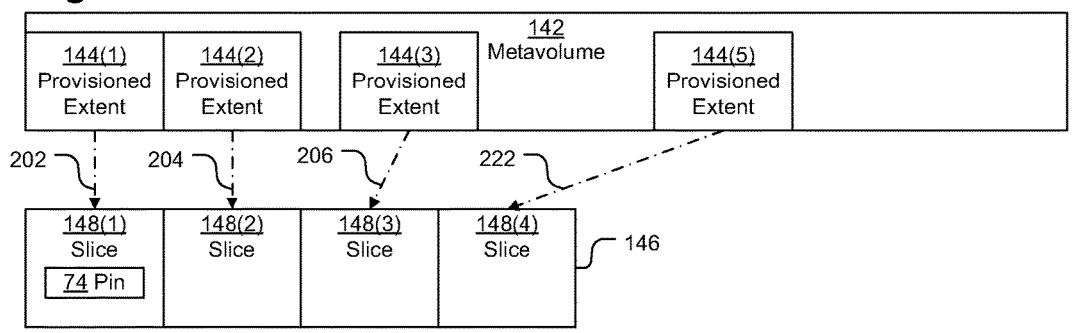

FIG. 3C depicts an example set 200C of mapping relationships 202, 204, 206, 222 between the provisioned extents 144 and the slices 148 of FIG. 2B after performance of step 93 has completed. Mapping relationships 202, 204, and 206 remain in place as before. However, the mirroring relationships 220(a), 220(b) are now broken, and a new mapping relationship 222 indicates that slice 148(4) maps to the addresses in the range of provisioned extent 144(5).

Figure 4:
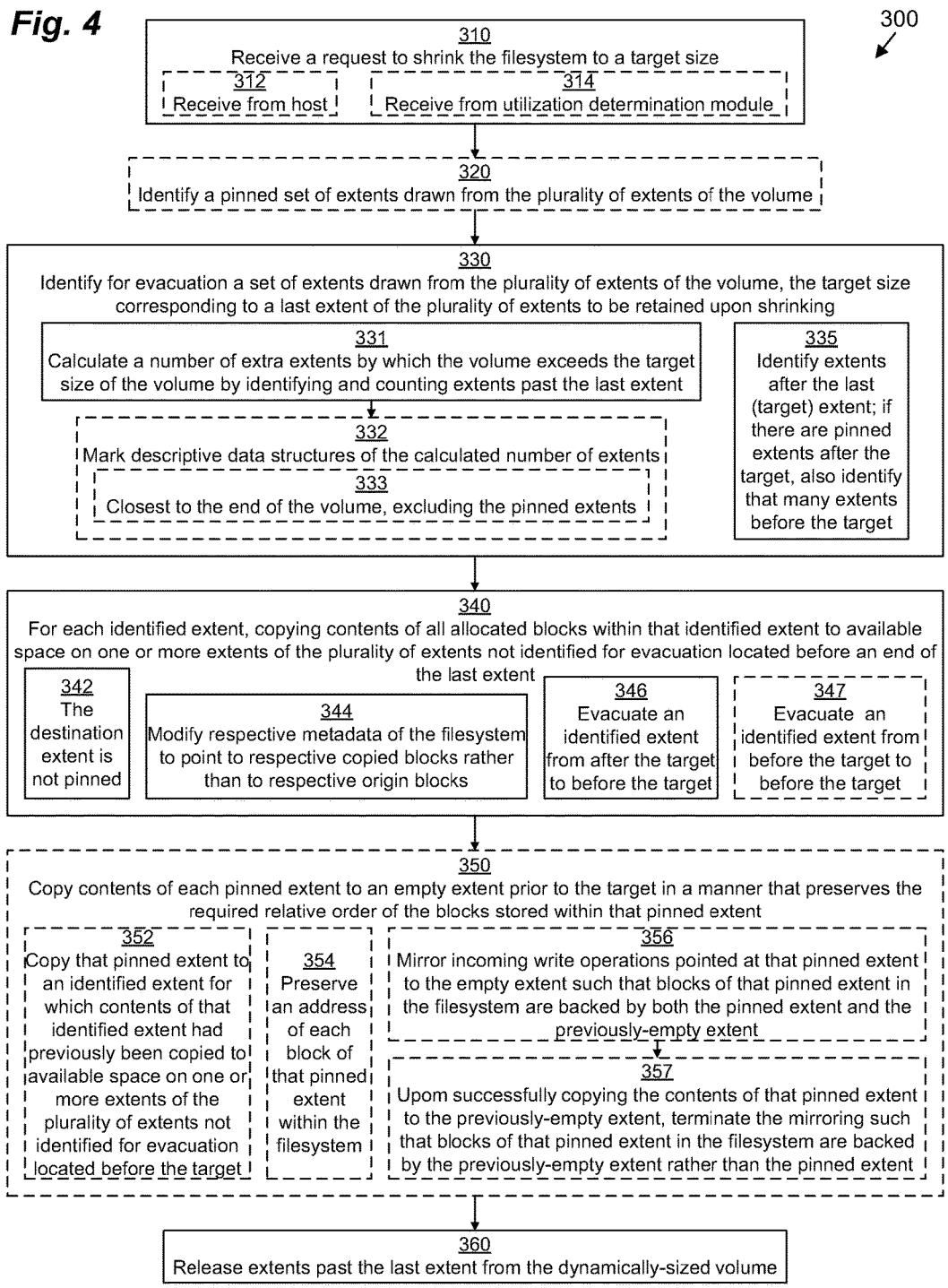
FIG. 4 is a flowchart depicting an example method according to various embodiments.

FIG. 4 illustrates an example method 300 performed filesystem reorganizer 64 for shrinking a dynamically-sized volume 42, 142 that supports a host-accessible filesystem 41, 141. It should be understood that any time a piece of software (e.g., filesystem reorganizer 64, automatic shrink scheduler 60, etc.) is described as performing a method, process, step, or function, in actuality what is meant is that a computing device (e.g., data storage system 32) on which that piece of software is running performs the method, process, step, or function when executing that piece of software on its processing circuitry 33. It should be understood that, in some embodiments, one or more of the steps may be omitted. Similarly, in some embodiments, one or more steps may be combined together or performed in a different order.

In step 310, filesystem reorganizer 64 receives a request to shrink a filesystem 41, 141 to a target size indicated by a target size indicator 56. In some embodiments (depicted as optional step 312), filesystem reorganizer 64 receives the request in the form of a shrink request 55 from a host 36. In other embodiments (depicted as optional step 314), filesystem reorganizer 64 receives the request from the automatic shrink scheduler 60, which has already determined that a shrink is currently warranted.

In step 320, which is only performed in embodiments in which slices 148 may be pinned, filesystem reorganizer 64 identifies a pinned set of provisioned extents 144 of the volume 142 on which the filesystem 141 rests. Step 320 may be accomplished, for example, by referencing descriptive data structures of the slices 148 of the volume file 146 to check for pin elements 74 (e.g., pin variables that have been set to TRUE rather than FALSE or the equivalents).

In step 330, filesystem reorganizer 64 identifies for evacuation a set of slices 148 (for marking) drawn from the plurality of slices 148 of the volume file 146. The target size indicated by the target size indicator 56 corresponds to an end (target EOV 57) of the last slice 148 of the volume file 146 to be retained by the volume file 146 upon shrinking. Thus, for example, if the target size indicator 56 indicates 1 GB, then the target EOV 57 will be at the end of four 256-MB slices 148. In some embodiments, the target size indicator 56 may indicate a value that is not an integral multiple of the size of a slice 148. In such embodiments, the target EOV 57 may be rounded up to the end of the next slice 148. Thus, for example, if the target size indicator 56 indicates 1.9 GB, then the target EOV 57 will be at the end of eight 256-MB slices 148.

Prior to identifying the set of slices 148 for marking, filesystem reorganizer 64 performs sub-step 331. In sub-step 331, filesystem reorganizer 64 calculates the number (i.e., shrink value N 62) of extra slices 148 by which the volume file 146 exceeds the target size by identifying and counting slices 148 to the right of the target EOV 57. Thus, for example, if the volume file 146 has seven slices 148 and the target size is four slices 148, then the shrink value N 62 equals three slices 148.

Then, in some embodiments, filesystem reorganizer 64 performs sub-step 332, in which it marks the descriptive data structures of N slices 148 of the volume file 146. In sub-sub-step 333, filesystem reorganizer 64 does this by selecting the N slices 148 of the volume file 146 closest to the end (the right) of the volume file 146, excluding any pinned slices 148. Thus, referring to the example of FIG. 2A, since there are seven slices 148, and the target EOV 57 is at four slices, N=3 and filesystem reorganizer 64 selects the three slices 148(7), 148(6), and 148(4) (excluding slice 148(5) because it is pinned) closest to the end of the volume file 146, and it establishes marks 50 within the descriptive data structures of those slices 148(7), 148(6), 148(4).

Sub-step 335 makes it clear that slices 148 after (to the right of) the target EOV 57 are marked. If there are no pinned slices 148 to the right of the target EOV, then all the slices 148 to the right of the target EOV 57 are marked. If there are any pinned slices 148 to the right of the target EOV 57, then those pinned slices 148 are not marked, but a number of non-pinned slices 148 to the left of the target EOV 57 corresponding to the number of pinned slices 148 to the right of the target EOV 57 are also marked.

In step 340, after identifying the (marked) set of slices 148 to be evacuated, for each marked slice 148, filesystem reorganizer 64 evacuates that marked slice 148 by copying contents of all allocated blocks 72 within that marked slice 148 to available space on one or more unmarked slices 148 of the volume file 146 located before the target EOV 57. Step 340 may be performed with reference to one or more of sub-steps 342, 344, 346, and 347.

In sub-step 342, in embodiments in which slices 148 may be pinned, filesystem reorganizer 64 refrains from copying blocks in the evacuation process to any pinned slice 148 to the left of the target EOV 57.

In sub-step 344, filesystem reorganizer 64 causes the filesystem 141 to modify its metadata (e.g., inodes 70 and/or indirect blocks 72(B), 72(F)) to point to the copied blocks 72 at their destination rather than at their original locations. Thus, for example, in the example of FIG. 2A-2B, since the contents of data block 72(H) are copied from slice 148(6) to data block 72(H') on slice 148(3), indirect block 72(F) is modified to point to a filesystem address within provisioned extent 144(3) instead of the original location within provisioned extent 144(6).

In sub-step 346, filesystem reorganizer 64 evacuates all marked slices 148 from the right of the target EOV 57 to available space to the left of the target EOV 57. The available space destination may be located on several different unmarked (and unpinned) slices 148 to the left of the target EOV 57.

In sub-step 347, in embodiments in which slices 148 may be pinned, filesystem reorganizer 64 evacuates all marked slices 148 from the left of the target EOV 57 to available space also to the left of the target EOV 57. The available space destination may be located on several different unmarked (and unpinned) slices 148 to the left of the target EOV 57.

In step 350, in embodiments in which slices 148 may be pinned, filesystem reorganizer 64 relocates each pinned slice 148 from the right of the target EOV 57 to an empty slice 148 left of the target EOV 57 in a manner that preserves the required relative order of the blocks 72 stored within that pinned slice 148. Step 350 may be performed with reference to one or more of sub-steps 352, 354, and the ordered set of 356 followed by 357.

In sub-step 352, filesystem reorganizer 64 relocates a pinned slice 148 from the right of the target EOV 57 to a marked slice 148 to the left of the target EOV 57 which was previously evacuated in step 340 (specifically in sub-step 347).

In sub-step 354, filesystem reorganizer 64 preserves the filesystem address of each block 72 within the pinned slice 148 being relocated once it is on the destination slice 148 to the left of the target EOV 57. This may be accomplished by re-mapping the destination slice 148 to the left of the target EOV 57 to the same provisioned extent 144 of the volume 142 that the pinned slice 148 was originally mapped to.

In sub-step 356, filesystem reorganizer 64 mirrors incoming write operations pointed at that pinned slice 148 to the target empty slice 148 to the left of the target EOV 57 such that blocks of the provisioned extent 144 originally backed by the pinned slice 148 are now backed by both the pinned slice 148 and the target empty slice 148 to the left of the target EOV 57.

Then, in sub-step 357, upon successfully copying the contents of that pinned slice 148 to the now-previously-empty target slice 148 to the left of the target EOV 57, filesystem reorganizer 64 terminates the mirroring such that blocks of the provisioned extent 144 originally backed by the original pinned slice 148 are now backed by the now-previously-empty slice 148 to the left of the target EOV 57 rather than by the original pinned slice 148 to the right of the target EOV 57.

In step 360, filesystem reorganizer 64 releases each slice 148 to the right of the target EOV 57 from the volume file 146 once that slice 148 has been either evacuated or relocated.

Step 360 is depicted as being performed after step 350, however, in some embodiments, step 360 may be performed in parallel with step 340 (i.e., as each marked slice 148 to the right of the target EOV 57 is evacuated in step 340, it may be released in step 360), and in other embodiments, step 360 may be performed after step 340 but before step 350.

It should be understood that method 300 may be performed in a highly-available manner. Thus, in some embodiments, even as the filesystem 141 is being shrunk, incoming reads and writes may still be possible. However, any incoming write to the filesystem 141 during performance of method 300 should be assigned to a filesystem address on a provisioned extent 144 that is backed by an unmarked slice 148. If there is no available space on any unmarked slice 148 or if performing the write operation would result in not enough space being available of the unmarked slices to properly finish method 300 (e.g., the size of the incoming write plus the currently-used space of the filesystem 141 exceeds the target size based on the target EOV 57), then the shrink attempt of method 300 should be aborted in order to complete the write operation.

Thus, efficient techniques for shrinking a dynamically-sized volume 46 that supports a host-accessible filesystem 41, 141 have been provided. This may be done by initially determining how many slices 48, 148 need to be evacuated to reach a target size, pre-marking that number of slices 48, 148, and evacuating the marked slices to unmarked slices. Because the slices 48, 148 to be evacuated are all pre-marked, contents of blocks 72 from those slices 48, 148 are moved to unmarked slices. Advantageously, the need to move data multiple times is reduced or eliminated.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Finally, it should be understood that all embodiments which have been described may be combined in all possible combinations with each other, except to the extent that such combinations have been explicitly excluded.

What is claimed is:

1. A method, performed by a data storage system, of shrinking a dynamically-sized volume that supports a host-accessible filesystem, the volume composed of a plurality of uniform-length extents of storage that are contiguously arranged within an address space of the volume, the volume having a length equal to a sum of lengths of the extents, the method comprising:
- in response to a request to shrink the host-accessible filesystem to a target size, identifying a target endpoint of the volume, the target endpoint provided at an address in the address space of the volume that aligns with a boundary between two extents;
- identifying a set of the extents for evacuation, the set of extents consisting of a number of extents that equals a number of extents disposed at addresses in the address space that exceed the address of the target endpoint;
- for each of the set of extents, copying contents of allocated blocks within that extent to available space on one or more extents not identified for evacuation and located at addresses less than the address of the target endpoint; and
- after copying the contents of allocated blocks from the identified extents, truncating the volume by releasing from the volume the extents disposed at addresses in the address space that exceed the address of the target endpoint.

2. The method of claim 1 wherein the set of extents identified for evacuation includes an evacuated extent occupying a range of addresses less than the address of the target endpoint, and wherein the method further comprises, prior to truncating the volume, copying contents of a particular extent located at an address range greater than the address of the target endpoint to the evacuated extent occupying the range of addresses less than the address of the target endpoint.

3. The method of claim 2, wherein the particular extent stores metadata of the host-accessible filesystem, and wherein copying the contents of the particular extent preserves an order of the contents of the particular extent such that the contents as copied to the evacuated extent have the same order.

4. The method of claim 3, wherein the host-accessible filesystem is built upon a sparse metavolume, the sparse metavolume having an address space, the address space of the sparse metavolume being larger than the address space of the volume, and wherein the method further comprises provisioning extents from the volume to the sparse metavolume to provide storage for supporting data and metadata of the host-accessible filesystem.

5. The method of claim 4, wherein the data storage system maps the particular extent to a location in the sparse metavolume, and wherein the location of the particular extent within the sparse metavolume remains constant after truncating the volume.

6. The method of claim 4 wherein the data storage system realizes the volume with a volume-file, the volume-file stored as a file in a container filesystem and rendered as the volume, and wherein the volume-file is partitioned into the plurality of extents.

7. The method of claim 6, wherein, upon truncating the volume, the method further comprises truncating the file that stores the volume-file in the container filesystem, such that the file becomes smaller.

8. The method of claim 2 wherein copying the contents of allocated blocks from each identified extent to available space on one or more extents not identified for evacuation includes modifying metadata of the host-accessible filesystem to point to locations of blocks to which the contents have been evacuated.

9. The method of claim 8 wherein, when copying the contents of the particular extent, the method further includes:
- mirroring a set of incoming write requests directed to the particular extent to the evacuated extent occupying the range of addresses less than the address of the target endpoint, such that data specified in the incoming write requests are written to both of these extents; and
- after copying the contents of the particular extent, redirecting later-arriving write requests directed to the particular extent to the previously evacuated extent.

10. The method of claim 1 wherein the method further comprises receiving the request to shrink the filesystem to the target size from a host accessing the filesystem.

11. The method of claim 1 wherein the method further comprises, in response to detecting that a current number of blocks in the volume exceeds a number of blocks allocated by the host-accessible filesystem by a pre-determined threshold:
- calculating the target size as a size greater than the number of allocated blocks and less than the current number of blocks in the volume; and
- providing the calculated target size in the request to shrink the filesystem.

12. The method of claim 1 wherein the method further comprises, after identifying the set of extents for evacuation, allocating blocks within the host-accessible filesystem only from regions that are not backed by any of the set of identified extents, thereby avoiding, until the volume has been truncated, block allocation from extents that have been identified for evacuation.

13. An apparatus comprising:
- persistent storage devices providing data storage;
- network interface circuitry configured to communicate with a host over a network; and
- processing circuitry coupled to memory to form a control circuit constructed and arranged to shrink a dynamically-sized volume that supports a host-accessible filesystem, the volume composed of a plurality of uniform-length extents of storage that are contiguously arranged within an address space of the volume, the volume having a length equal to a sum of lengths of the extents, the control circuit shrinking the volume by:
  - in response to a request to shrink the host-accessible filesystem to a target size, identifying a target endpoint of the volume, the target endpoint provided at an address in the address space of the volume that aligns with a boundary between two extents;
  - identifying a set of the extents for evacuation, the set of extents consisting of a number of extents that equals a number of extents disposed at addresses in the address space that exceed the address of the target endpoint;
  - for each of the set of extents, copying contents of allocated blocks within that extent to available space on one or more extents not identified for evacuation and located at addresses less than the address of the target endpoint; and
  - after copying the contents of allocated blocks from the identified extents, truncating the volume by releasing from the volume the extents disposed at addresses in the address space that exceed the address of the target endpoint.

14. A computer program product comprising a non-transitory computer-readable storage medium storing a set of instructions, which, when executed by control circuitry of a data storage system, cause the control circuitry to perform a method of shrinking a dynamically-sized volume that supports a host-accessible filesystem, the volume composed of a plurality of uniform-length extents of storage that are contiguously arranged within an address space of the volume, the volume having a length equal to a sum of lengths of the extents, the method comprising:

in response to a request to shrink the host-accessible filesystem to a target size, identifying a target endpoint of the volume, the target endpoint provided at an address in the address space of the volume that aligns with a boundary between two extents;

identifying a set of the extents for evacuation, the set of extents consisting of a number of extents that equals a number of extents disposed at addresses in the address space that exceed the address of the target endpoint;

for each of the set of extents, copying contents of allocated blocks within that extent to available space on one or more extents not identified for evacuation and located at addresses less than the address of the target endpoint; and after copying the contents of allocated blocks from the identified extents, truncating the volume by releasing from the volume the extents disposed at addresses in the address space that exceed the address of the target endpoint.

15. The computer program product of claim 14 wherein the set of extents identified for evacuation includes an evacuated extent occupying a range of addresses less than the address of the target endpoint, and wherein the method further comprises, prior to truncating the volume, copying contents of a particular extent located at an address range greater than the address of the target endpoint to the evacuated extent occupying the range of addresses less than the address of the target endpoint.

16. The computer program product of claim 15, wherein the particular extent stores metadata of the host-accessible filesystem, and wherein copying the contents of the particular extent preserves an order of the contents of the particular extent such that the contents as copied to the evacuated extent have the same order.

17. The computer program product of claim 16, wherein the host-accessible filesystem is built upon a sparse metavolume, the sparse metavolume having an address space, the address space of the sparse metavolume being larger than the address space of the volume, and wherein the method further comprises provisioning extents from the volume to the sparse metavolume to provide storage for supporting data and metadata of the host-accessible filesystem.

18. The computer program product of claim 14 wherein the method further comprises receiving the request to shrink the filesystem to the target size from a host accessing the filesystem.

19. The computer program product of claim 14 wherein the method further comprises, in response to detecting that a current number of blocks in the volume exceeds a number of blocks allocated by the host-accessible filesystem by a pre-determined threshold:

calculating the target size as a size greater than the number of allocated blocks and less than the current number of blocks in the volume; and providing the calculated target size in the request to shrink the filesystem.

20. The computer program product of claim 14 wherein the method further comprises, after identifying the set of extents for evacuation, allocating blocks within the host-accessible filesystem only from regions that are not backed by any of the set of identified extents, thereby avoiding, until the volume has been truncated, block allocation from extents that have been identified for evacuation.

\* \* \* \* \*